US012572841B2

(12) United States Patent
Asif et al.

(10) Patent No.: US 12,572,841 B2
(45) Date of Patent: Mar. 10, 2026

(54) MOBILE AI

(71) Applicant: International Business Machines Corporation, Armonk, NY (US)

(72) Inventors: Umar Asif, Melbourne (AU); Stefan von Cavallar, Sandringham (AU); Jianbin Tang, Doncaster East (AU); Stefan Harrer, Hampton (AU)

(73) Assignee: International Business Machines Corporation, Armonk, NY (US)

( * ) Notice: Subject to any disclaimer, the term of this patent is extended or adjusted under 35 U.S.C. 154(b) by 176 days.

(21) Appl. No.: 17/036,218

(22) Filed: Sep. 29, 2020

(65) Prior Publication Data

US 2022/0101184 A1 Mar. 31, 2022

(51) Int. Cl.
*G06N 20/00* (2019.01)
*G06N 3/082* (2023.01)

(52) U.S. Cl.
CPC ............. *G06N 20/00* (2019.01); *G06N 3/082* (2013.01)

(58) Field of Classification Search
CPC ............................... G06N 20/00; G06N 3/082
USPC .......................................................... 706/12
See application file for complete search history.

(56) References Cited

U.S. PATENT DOCUMENTS

| | | | |
|---|---|---|---|
| 7,318,051 B2 | 1/2008 | Weston et al. | |
| 9,002,682 B2 | 4/2015 | Kasabov | |
| 9,161,705 B2 | 10/2015 | Tamil et al. | |

| | | | |
|---|---|---|---|
| 9,460,400 B2 | 10/2016 | De Bruin et al. | |
| 12,079,718 B2 | 9/2024 | Ida | |
| 2009/0287622 A1 | 11/2009 | Wechsler | |
| 2013/0153771 A1 | 6/2013 | Kiesel et al. | |
| 2018/0103917 A1 | 4/2018 | Kim et al. | |
| 2018/0158552 A1 | 6/2018 | Liu et al. | |
| 2018/0189679 A1 | 7/2018 | Kang et al. | |
| 2018/0268265 A1 | 9/2018 | Sohn et al. | |
| 2018/0268266 A1 | 9/2018 | Sohn et al. | |
| 2018/0268292 A1 | 9/2018 | Choi et al. | |
| 2020/0042883 A1 | 2/2020 | Sato | |
| 2020/0111025 A1 | 4/2020 | Han et al. | |

(Continued)

FOREIGN PATENT DOCUMENTS

| | | |
|---|---|---|
| CN | 102802161 A | 11/2012 |
| CN | 108830813 A | 11/2018 |

(Continued)

OTHER PUBLICATIONS

Yang et al., "Concepts of Artificial Intelligence for Computer-Assisted Drug Discovery," Chemical Reviews, ACS Publications, Nov. 29, 2018, 75 pages, http://dx.doi.org/10.1021/acs.chemrev.8b00728.

(Continued)

*Primary Examiner* — Tsu-Chang Lee
(74) *Attorney, Agent, or Firm* — Kimberly Zillig

(57) ABSTRACT

A machine learning model can be optimized for deployment on a device based on hardware specifications of the device. An existing model is acquired and pruned to reduce hardware resource consumption of the model. The pruned model is then trained based on training data. The pruned model is also trained based on a collection of "teacher" models. Performance of the trained model is then evaluated and compared to performance requirements, which can be based on the hardware specifications of a device.

20 Claims, 8 Drawing Sheets

(56)                References Cited

U.S. PATENT DOCUMENTS

| | | | |
|---|---|---|---|
| 2020/0125927 A1 | 4/2020 | Kim | |
| 2020/0134506 A1 | 4/2020 | Wang et al. | |
| 2020/0134628 A1 | 4/2020 | Jia | |
| 2020/0210836 A1 | 7/2020 | Kim et al. | |
| 2020/0364573 A1* | 11/2020 | Ramachandran | G06F 9/3455 |
| 2021/0042645 A1 | 2/2021 | Sharma | |
| 2021/0056718 A1 | 2/2021 | Wang | |
| 2022/0004921 A1 | 1/2022 | Balaraman | |
| 2022/0126864 A1* | 4/2022 | Moustafa | B60W 60/001 |

FOREIGN PATENT DOCUMENTS

| | | | |
|---|---|---|---|
| CN | 109637546 A | 4/2019 | |
| CN | 109800886 A | 5/2019 | |
| CN | 110232203 A | 9/2019 | |
| CN | 110390387 A | 10/2019 | |
| CN | 111105008 A | 5/2020 | |
| JP | H05-282269 A | 10/1993 | |
| JP | 2019-096285 A | 6/2019 | |
| JP | 2019-185275 A | 10/2019 | |
| JP | 2020-071883 A | 5/2020 | |
| JP | 2020-087288 A | 6/2020 | |
| WO | 2016110804 A1 | 7/2016 | |
| WO | 2019/135274 A1 | 7/2019 | |

OTHER PUBLICATIONS

Liu et al., "Learning To Propagate Labels: Transductive Propagation Network for Few-Shot Learning," International Conference on Learning Representations 2019, Feb. 8, 2019, 14 pages.

Tan et al., "EfficientNet: Rethinking Model Scaling for Convolutional Neural Networks," International Conference on Machine Learning 2019, May 28, 2019, 11 pages.

Yang et al., "NetAdapt: Platform-Aware Neural Network Adaptation for Mobile Applications," European Conference on Computer Vision 2018, Arp. 9, 2018, 16 pages.

Dong et al., "DPP-Net: Device-aware Progressive Search for Pareto-optimal Neural Architectures," European Conference on Computer Vision 2018, Jun. 21, 2018, 15 pages.

Iscen et al., "Label Propagation for Deep Semi-supervised Learning," Computer Vision and Pattern Recognition 2019, Apr. 9, 2019, 10 pages.

Asif et al., "Mobile AI," U.S. Appl. No. 17/036,248, filed Sep. 29, 2020.

List of IBM Patents or Patent Applications Treated as Related, Dated Sep. 27, 2020, 2 pages.

Chen et al., "Shallowing Deep Networks: Layer-Wise Pruning Based on Feature Representations," IEEE Transactions on Pattern Analysis and Machine Intelligence, vol. 41, No. 12, Dec. 2019, 9 pages.

Elkerdawy et al., "To Filter Prune, or to Layer Prune, That Is The Question," arXiv:2007.05667v3 [cs.CV] Nov. 8, 2020, 26 pages.

U.S. Appl. No. 17/036,248 Notice of References Cited, mailed Aug. 28, 2023, 1 pg.

Japan Patent Office, "Decision of Refusal" May 7, 2025, 05 Pages, JP Application No. 2021-158544.

Japan Patent Office, "Notice of Reasons for Refusal," Dec. 24, 2024, 7 Pages, JP Application No. 2021-158544.

Sarwar, S.S et al. "Incremental Learning in Deep Convolutional Neural Networks Using Partial Network Sharing," in IEEE Access, vol. 8, pp. 4615-4628, 2019, doi: 10.1109/ACCESS.2019.2963056. https://ieeexplore.ieee.org/document/8945358.

U.S. Appl. No. 17/036,248 Notice of References Cited, mailed Mar. 22, 2024, 1 pg.

Bhardwaj, K. et al. 2019. Memory- and CommunicationAware Model Compression for Distributed Deep Learning Inference on IoT. ACM Trans. Embedd. Comput. Syst. ( 2019), 22 pages. https://doi.org/10.48550/arXiv.1907.11804.

GB2113292.3 Combined Search Report and Examination Report, mailed Jun. 10, 2022, 12 pgs.

GB2113292.3 Examination Report, mailed Apr. 28, 2023. 6 pgs.

The State Intellectual Property Office of People's Republic of China, "Second Office Action", Sep. 1, 2025, 15 Pages, CN Application No. 202111137759.0.

U.S. Appl. No. 17/036,248 Notice of References Cited, mailed Dec. 22, 2023, 1 pg.

* cited by examiner

Acquire Labeled Input Data
& Unlabeled Input Data
602

Input Unlabeled Input Data
Into Model
604

Generate Unlabeled Feature
Data
606

Input Labeled Input Data
Into Model
608

Generate Labeled Feature
Data
610

Label Unlabeled Feature
Data Via Transduction
612

Retrain Model Via Labeled
Feature Data
614

MOBILE AI

BACKGROUND

The present disclosure relates to machine learning and, more specifically, to optimizing performance of machine learning models.

Machine learning models, such as neural networks, have an increasingly wide array of applications. While they may be beneficial, machine learning models still have associated drawbacks and costs. For example, training a model can be particularly resource-intensive, and accuracy is often anti-correlated with required computing resources.

In particular, modern systems are still unable to automatically configure and deploy a machine learning model on relatively low-power devices while ensuring that the deployed model meets both accuracy and resource performance requirements. For example, machine learning models utilized by low-power devices frequently have limited performance (due to hardware overhead required by more advanced machine learning models). Further, in many fields (such as medicine), there may be a limited amount of training data available, making training new models particularly difficult. Thus, even though a given task (such as a classification) may be reliably accomplished via a prior art machine learning model, such models will likely struggle to perform within given hardware specifications of lower-power devices. Similarly, while many prior art models may be able to function with limited hardware resources, their performance (e.g., accuracy) typically suffers as a result of their "lightweight" configuration.

SUMMARY

Some embodiments of the present disclosure can be illustrated as a first method. The first method includes receiving hardware specifications of a device. The first method also includes determining a performance requirement based on the hardware specifications of the device. The first method also includes acquiring a machine learning model having a set of layers. The first method also includes acquiring a teacher model. The first method also includes deleting one or more layers of the set of layers from the machine learning model, resulting in a student model with a pruned set of layers. The first method also includes training the student model based on training data and the teacher model. The first method also includes evaluating a performance of the student model and comparing the performance of the student model and the performance requirement. The first method also includes determining (based on the comparison) to select a model having a highest performance. This first method advantageously enables configuring a model to function within requirements based on hardware specifications of a device while training the model to meet performance standards.

Some embodiments of the present disclosure can be illustrated as a second method. The second method includes the first method as discussed above, wherein the training (of the first method, as discussed above) includes inputting training data into the student model and the teacher model, receiving a student feature from the student model, receiving a teacher feature from the teacher model, performing a first comparison between the student feature and the teacher feature, receiving a student output from the student model, performing a second comparison between the student output and the training data, and adjusting at least one layer of the pruned set of layers of the student model based on the first comparison and the second comparison. This second method advantageously enables configuring a student model to perform similarly to an advanced teacher model despite the student model having a substantially reduced resource overhead compared to the teacher model.

Some embodiments of the present disclosure can be illustrated as a third method. The third method includes the first method as discussed above, wherein the deleting one or more layers (of the first method, as discussed above) includes determining, based on the performance requirement, a number of layers to delete, selecting the one or more layers based on the number at random, and deleting the selected layers. This third method advantageously enables pruning a model based on hardware specifications of a device with improved efficiency.

Some embodiments of the present disclosure can be illustrated as a fourth method. The fourth method includes obtaining labeled data. The fourth method also includes obtaining unlabeled data. The fourth method also includes comparing the labeled data and the unlabeled data. The fourth method also includes labeling, based on the comparing, the unlabeled data, resulting in weak-labeled data. The fourth method also includes retraining, based on the weak-labeled data, a model, resulting in a retrained model. This fourth method advantageously enables retraining a model based on initially unlabeled data.

Some embodiments of the present disclosure can be illustrated as a fifth method. The fifth method includes the fourth method as discussed above. The fifth method also includes obtaining a teacher output from a teacher model, wherein the retraining (of the fourth method, as discussed above) is based further on the hard-labeled data and the teacher output. This fifth method advantageously enables retraining a model based on initially unlabeled data with improved performance.

Some embodiments of the present disclosure can be illustrated as a sixth method. The sixth method includes the fourth method as discussed above, wherein the obtaining labeled data (of the fourth method, as discussed above) includes receiving labeled input data and generating, via the model based on the labeled input data, labeled feature data, wherein the labeled feature data is the labeled data. Further in the sixth method, the obtaining unlabeled data (of the fourth method, as discussed above) includes collecting unlabeled input data and generating, via the model based on the unlabeled input data, unlabeled feature data, wherein the unlabeled feature data is the unlabeled data. This sixth method advantageously enables retraining a model based on initially unlabeled data with improved privacy security, and further with improved efficacy.

Some embodiments of the present disclosure can also be illustrated as a computer program product comprising a computer readable storage medium having program instructions embodied therewith, the program instructions executable by a computer to cause the computer to perform any of the methods discussed above. This advantageously enables configuring a model to function within requirements based on hardware specifications of a device while training the model to meet performance standards.

Some embodiments of the present disclosure can be illustrated as a system. The system may comprise memory and a central processing unit (CPU). The CPU may be configured to execute instructions to perform any of the methods discussed above. This advantageously enables configuring a model to function within requirements based on hardware specifications of a device while training the model to meet performance standards.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure. Features and advantages of various embodiments of the claimed subject matter will become apparent as the following Detailed Description proceeds, and upon reference to the drawings, in which like numerals indicate like parts, and in which:

Figure 1:
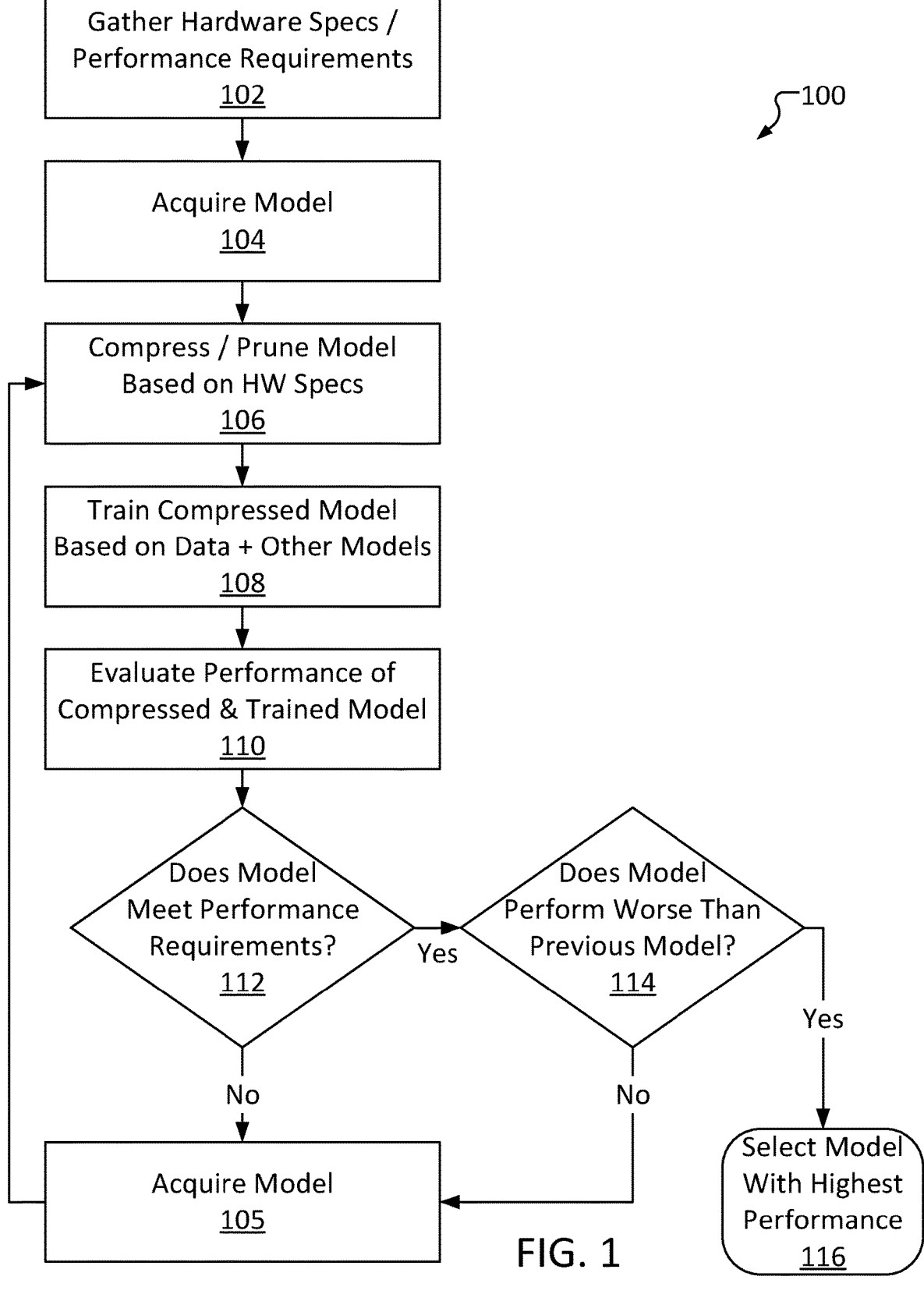
FIG. 1 is a high-level automated composite knowledge distillation method, consistent with several embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to systems and methods to optimize a model with respect to specifications of a device. More particular aspects relate to a system to acquire a machine learning model structure, compress the structure, train the compressed model, evaluate performance of the trained model, and select a model with a highest performance.

Further aspects of the present disclosure relate to systems and methods to improve model performance based on measured data. More particular aspects of the present disclosure relate to a system to receive unlabeled data, compare the unlabeled data to known data, label the unlabeled data based on the comparison, and retrain the model based on the newly-labeled data.

The systems and methods described in the present disclosure enable automated compact model compression via "composite knowledge distillation," advantageously enabling a system to optimize a machine learning model, such as a neural network, based upon hardware specifications and/or related performance requirements. In other words, while most state-of-the-art systems accept a tradeoff between accuracy/speed and resource requirements, a model trained via the systems and methods of the present disclosure can be optimized to maximize accuracy and/or speed despite functioning on relatively low-power hardware, such as a mobile device or wrist-mounted device.

In addition, systems and methods consistent with the present disclosure can advantageously enable training a model to reliably operate on a lower-power device even with a relatively limited training dataset.

Throughout this disclosure, reference is made to "machine learning models," shortened for simplicity to "models." Models may include, for example, artificial neural networks such as convolutional neural networks (CNNs), multilayer perceptrons (MLPs), recurrent neural networks (RNNs), Long Short Term Memory (LSTM) RNNs, and the like. Models can serve many different purposes, such as classification, prediction, etc. Typically, a model will receive an input of data, and pass the data through a number of "layers." For example, data may be input into a first layer, which will manipulate the data (based on the configuration of the layer) and produce an output of one or more "features" (often grouped into a "feature vector"). A layer's configuration includes a number of various "channels" and "filters," which are responsible for lower-level aspects of the data manipulation performed by the layer.

As an example, input data may be an image, wherein a first layer may identify edges in the image, producing a list ("vector") of data describing all the edges detected in the image ("features"). The features generated by the first layer are then fed into a second layer, which performs further manipulation and produces a second feature vector, and so on. The end result is a final "output." As used herein, "output" refers to the final output/decision/classification of a model, unless otherwise specified. The layout/configuration and order of various layers is generally referred to as the model's "structure."

Machine learning models are often "trained," wherein one or more layers are adjusted such that they modify their inputs differently. As a simple example, a first layer may initially multiply an input by 2, but during the training process, the first layer may be adjusted to multiply the input by 1.5 instead. Of course, more complicated layers can be adjusted in more nuanced ways.

The machine learning models trained and/or optimized in accordance with the systems and methods of the present disclosure may be optimized to meet one or more performance requirements. Performance requirements, as used herein, may include resource-based requirements (such as a maximum memory footprint, a maximum CPU usage, a maximum estimated power consumption, etc.), output-based requirements (such as accuracy rating, inference speed, etc.), or a combination of the two.

In many fields, even a fully trained and vetted model may lose accuracy over time. While models can be configured to learn over time (which can, in some instances, erroneously result in degradation of the model), another common cause of loss in accuracy can be changes to the input data to the model. As an example, electroencephalogram (EEG) data of a patient may naturally change over time, even regardless of changes in the patient's condition. A healthy patient's EEG recorded today may be substantially different from the same healthy patient's EEG from years (or even months) ago, even if they remain relatively consistent over smaller timespans. Notably, this is not (necessarily) caused by any factors beyond the patient's own physiology; the patterns of emissions of brain waves can simply "drift" over time. While patterns of various issues (such as seizures) may still remain relatively consistent, the "background" or "baseline" state can change substantially to the point where a model may be rendered unable to parse through to detect presence (or absence) of such important patterns. Thus, a model that was initially accurate at classifying the patient's EEG may eventually become obsolete. While models can be retrained or improved over time, known datasets can be relatively sparse in particularly narrow fields (such as neurology).

Further, as background/baseline patterns and/or noise can vary significantly between patients, known datasets may not be sufficient to train (or retrain) a model for a particular patient. One solution in the art is to periodically record a dataset from the patient, have a professional (such as a medical provider/specialist) evaluate the recorded dataset and manually annotate/label it, and utilize the patient-specific dataset for retraining the model. However, this can be prohibitively time-consuming, inconvenient, and/or expensive for both the patient and the professional. Further, this may raise concerns regarding the sensitive/personally identifiable nature of the patient's data.

Systems and methods described in the present disclosure further enable improving accuracy of a machine learning model based on observed (i.e., initially unlabeled) data, advantageously improving performance of the model without needing to have observed data manually annotated. This may allow a model to gradually grow to be more robust over time, even as a patient's physiology drifts and new patterns (i.e., patterns not represented in the model's initial training data set, or possibly any known data set) are observed.

FIG. 1 is a high-level automated composite knowledge distribution method 100, consistent with several embodiments of the present disclosure. Method 100 advantageously enables training and optimization of a machine learning model with respect to device-specific performance requirements.

Method 100 comprises gathering performance requirements and/or hardware specifications at operation 102. Operation 102 may include, for example, receiving data from a device, such as a mobile device, describing the hardware of the device (such as available memory, processor make/model, etc.). Performance requirements can be gleaned from this data (particularly resource-based requirements such as a maximum memory footprint). In some embodiments, operation 102 may include receiving output-based requirements outside of hardware specifications. For example, operation 102 may include receiving, from a user or device, a minimum accuracy rating, a minimum inference speed, and the like based on the circumstances in which the device is typically used.

Method 100 further comprises acquiring a model at operation 104. Operation 104 may include, for example, downloading a machine learning model from a repository of models that are known to be accurate. The model acquired at operation 104 may be one of multiple different types of models (e.g., CNNs, RNNs, etc.). Notably, the acquired model may be meant for a different purpose than the model being created and optimized via method 100. As an example, method 100 may be performed to train and optimize a seizure-detection model intended for deployment on a wrist-mounted computing device. Operation 104 may nonetheless include selecting an established CNN (such as, for example, an EFFICIENTNET model) that has been previously trained to perform image recognition based on an input image. This is possible because, for purposes of method 100, the structure of the selected model (e.g., the composition of the individual layers) is often more important than the actual original purpose of the selected model (e.g., facial recognition, playing chess, etc.). The repository accessed in operation 104 may be available to the public, stored in a cloud database, stored in local long-term memory, etc.

Method 100 further comprises pruning the selected machine learning model based on the performance requirements at operation 106. Operation 106 may include, for example, deleting one or more layers from the selected model. In some embodiments, operation 106 may include deleting one or more blocks (continuous groups of layers) from the selected model. The layers and/or blocks selected for deletion at operation 106 may be selected at random, possibly with some constraints such as selecting layers that are (or, in some embodiments, are not) adjacent to other selected layers. In some embodiments, layers may be deleted based (in part) on the performance requirements received at operation 102. Operation 106 may include determining a number of layers in the selected model and deleting layers until the number is below a threshold. The total number of layers included in a model (the model's "layer count") is a major factor of the model's resource requirements (other factors may include size of filters used in each layer, resolution/dimensions of the outputs of each layer, etc.). For example, a model with 300 layers will generally consume substantially more memory and CPU overhead than a model with 100 layers. In view of this, the threshold may be determined based on, for example, a maximum memory and/or a CPU model of the device's hardware. The threshold may limit certain properties of the model (e.g., a maximum number of layers, a maximum number of channels per layer, etc.). As an example, a device may have 512 MegaBytes (MB) of memory (such as random access memory (RAM)) and a CPU operating at 120 MegaHertz (MHz). These hardware specifications may be considered in generating the threshold. As a simple example, a model to be deployed on a device may have a maximum layer count of r/10 layers (where r is the total memory of the device, in MB) or c/2 layers (where c is the frequency of the CPU of the device, in MHz), whichever is lower (rounded down to the nearest integer). Thus, a model to be deployed on the example device described above may have a maximum layer count of 51 layers (as 512/10<120/2). Note that these metrics are not necessarily the resource requirements of the model (e.g., a 3-layer model may not necessarily require 30 MB of RAM or be half as resource-intensive as a 6-layer model, etc.). In some embodiments, the threshold may describe a maximum amount of memory the model may consume, a maximum amount of CPU overhead, etc.

The pruned selected model is referred to herein as a "student model." Notably, in some embodiments, remaining layers of the student model (i.e., layers that were not deleted as part of operation 106) may remain relatively unchanged. For example, internal configurations of the layers (individual neurons, etc.) may remain unaffected, enabling the student model to retain part of the structure of the original selected model. However, connections between deleted layers and remaining layers may be severed, resulting in reduced accuracy, or even complete inoperability, of the student model. In some embodiments, rather than (or in addition to) pruning layers, channels and/or filters within one or more layers may be deleted, reducing an overall complexity of the layers.

As an illustrative example, a model may have 6 layers ("layers 1-6"), where each layer's output is fed into the next layer's input (e.g., each of layers 1-5 is "connected" to the following layer). In other words, layer 1 is connected to layer 2 (meaning layer 1's output is used as layer 2's input), layer 2 is connected to layer 3 (meaning layer 2's output is used as layer 3's input), and so on. The layers themselves are generally not identical; each layer will manipulate its respective input in a different way in order to produce its individual output. The layers themselves are developed over time in the process of training the model (noting that the model acquired at operation 104 has already been trained). For example, layer 1 may manipulate input data to produce an output feature vector such that, if the input data comprises an image, the output feature vector will describe edges of the image. Layer 2 may manipulate an input feature vector to produce an output feature vector such that, if the input feature vector describes edges of an image, the output feature vector will describe recognized shapes in the image, and so on. Thus, should operation 106 include deleting layer 1, the input data may be directly fed into layer 2. The input to layer 2 will therefore no longer be a feature vector describing edges of an image (instead, the input will be the image itself). However, as layer 2 itself is unchanged, layer 2 will perform the same manipulations to the input data as it did previously. Thus, layer 2's output feature vector will be unlikely to accurately describe recognized shapes of the image. Instead, layer 2's output feature vector may be generally irrelevant "garbage data." Since layers 3-6 are similarly unchanged, this discrepancy may have cascading effects throughout the model. As a result, operation 106's deletion may result in an accuracy penalty to the final output of the model. Notably, some layers may merely make minor modifications to their input. Thus, depending upon the layer(s) deleted, the overall accuracy penalty may range from being relatively minor to being so significant as to render the model functionally inoperable.

While the pruning may result in a significant accuracy penalty to the overall model, the structure of the model may mostly remain intact. Put differently, the model may be in a state where, with some training to "bridge the gaps" left by the deleted layers, the model may be restored to functionality. Continuing with the example described above, layers 3-6 may still function as they previously did, so if layer 2 may be adjusted to convert an input image into an output feature vector describing recognized shapes in the image, the model may return to producing (relatively) accurate results.

Method 100 further comprises training the student model at operation 108. Operation 108 may include, for example, inputting known training data into the student model, receiving an output from the student model, comparing the output to the known result, and making adjustments to one or more layers of the student model based on the comparison. Operation 108 may further include inputting the training data into one or more "teacher" models (other established/known-good models). Operation 108 may include selecting teacher models from a repository; for example, the teacher models may be other models in the repository from which the model was selected at operation 104. In some instances, operation 108 may utilize all teacher models in a given repository. In some instances, operation 108 may select a number of teacher models (e.g., at random). As an example, operation 104 may include selecting a model at random from a repository having 15 models, and operation 108 may include utilizing some or all of the remaining 14 models. In some instances, the model selected as part of operation 104 may also be selected as a teacher model at operation 108.

In some embodiments, the adjustments made to the layers of the student model as part of operation 108 may be further based on comparisons between the outputs from the teacher models to the output of the student model. In general, an output of the student model (a "student output") and outputs of the teacher models ("teacher outputs") are compared to minimize a difference between them during the training process. For example, if a student output differs substantially from a teacher output, then layers of the student model may be adjusted even if the output is relatively similar to an expected output (e.g., a student output of "35" may be similar enough to an expected output of "36," but if a teacher output is "37," layers of the student model may still be adjusted).

In some embodiments, rather than (or in addition to) comparing outputs of the student and teacher models, operation 108 may include comparing features output by "intermediate" layers of the student model and teacher models. In some embodiments, the student model layer selected for comparison may be selected at random. In some embodiments, the layers may be selected based upon the pruning; for example, a first unadjusted layer after a last adjusted (or deleted) layer may be selected. As an example, a model selected at operation 104 may have 4 layers A, B, C and D, and operation 106 may include deleting layer B. In such an example, operation 108 may include comparing a feature vector output by the student's layer C to a feature vector output by a 4-layer teacher model's layer C. As an additional example, a last unadjusted layer before a first adjusted (or deleted) layer may be selected (e.g., output of the student's layer A may be compared to output of the teacher's layer B). For teacher models with different numbers of layers than the model selected at operation 104 and after pruning at operation 106, layers may be selected for output comparison based on their order within the model (e.g., feature vectors output by the second-to-last layer of each model may be selected for comparison). This may advantageously enable training the student model to perform in a manner similar to the teacher models, despite being substantially simpler (due to the pruning of operation 106).

Method 100 further comprises evaluating performance of the pruned/trained student model at operation 110. Operation 110 may include, for example, inputting different known data (e.g., a second set of known data different than the training data) into the student model and analyzing performance of the student model in determining an output. As an example, operation 110 may include determining an accuracy of the student model, an inference speed (how long the student model took to determine the output), a memory footprint (how much memory the student model required), a peak CPU usage, an estimated power consumption, etc.

Method 100 further comprises determining whether the trained student model meets performance requirements at operation 112. Operation 112 may include, for example, comparing the performance of the student model determined at operation 110 to the performance requirements gathered at operation 102. As an example, operation 112 may include determining whether the student model's memory usage is below a maximum threshold indicated by device hardware, whether the student model's inference speed is above a minimum set by a user, and so on.

If the student model fails to meet one or more performance requirements (112 "No"), method 100 proceeds to generate a new student model and try again, starting by acquiring a model at operation 105. Operation 105 may be performed in a substantially similar manner to operation 104. Notably, the model selected at operation 105 may be the same model selected at operation 104 (or a previous iteration of operation 105) or a "new" model (e.g., a model that has not yet been pruned/trained/evaluated via method 100). Operation 105 may include, for example, selecting a model from a repository or other external source (possibly including a source accessed at operation 104). In some embodiments, a copy of the model selected at operation 104 may have been cached, and thus operation 105 may include loading the copy. In some embodiments, the model selected at operation 105 may be based on the comparison of operation 112; for example, if the student model performed significantly worse than the performance requirements, operation 105 may include selecting a new model rather than the same model used previously. In some embodiments, trends may be tracked. For example, if student models generated from a particular model are consistently worse, regardless of pruning/training, the particular model may be disqualified from selection at later iterations of operation 105.

Once a model has been selected at operation 105, method 100 then returns to prune, train, and evaluate the model at operations 106-110 to generate a new student model. In some embodiments, operation 105 may select a new model every iteration until all models available have been "tried." In some instances, the new student model may be generated by selecting the same model but pruning it differently, such as by deleting more/fewer/different layers, but otherwise training in the same way. Even though only the pruning was performed differently, this will still result in a different trained student model. Thus, when the different student model is evaluated at operation 110, it may be determined to perform better than the previous model (or worse). In some instances, a new student model may be generated by selecting the same model, pruning it in the same way (e.g., deleting the same layers/blocks at operation 106 as those deleted at the previous iteration of operation 106), but training it differently at operation 108, such as with different datasets than those used at the previous iteration of operation 108. In some instances, the new student model may be generated by selecting a different model, but otherwise pruning the same layers and training in the same way. Thus, multiple different approaches to generating new student models can be implemented and are considered.

If the student model meets every performance requirement (112 "Yes"), method 100 further comprises determining whether the model performs worse than a previous model at operation 114. Operation 114 may include, for example, comparing performance of the student model currently being considered (the "current" student model) to performance of a set of previous student models. The performance of the current student model may be compared to performance of each previous student model in the set, or to an average or maximum of performance of each previous student model in the set. Depending upon embodiment/use case, the set of previous student models may exclude student models that did not met the performance requirements of operation 112. Depending upon embodiment/use case, the set of previous student models may only all previous student models or only some (e.g., only the immediately previous student model, the last 3 student models, etc.).

As an illustrative example, 35 student models may have been generated and evaluated (referred to as "model 1," "model 2," and so on). Model 2, model 32, model 33 and model 35 (where model 35 is the "current" student model, for purposes of this example) may have each satisfied all the performance requirements, and model 1, models 3-31, and model 34 may have each failed to satisfy all of the performance requirements. Operation 114 may thus include comparing performance of model 35 to performance of, depending upon use case and/or embodiment: model 34; models 32-34; model 33; models 2, 32, and 33; models 1-34; an average and/or maximum of any of the listed groups, and so on.

Performance comparisons may be organized by "category"; for example, operation 114 may include comparing amounts of memory consumed, inference speeds, accuracies, etc. of different models. Depending upon embodiment/use case, operation 114 may include determining whether performance of the current student model is superior to performance of the set of previous student models in each performance category, a majority of categories, or a specific group of one or more categories. For example, performance of the current student model may be considered "superior" if it has a higher accuracy, lower inference speed, etc. In some embodiments, performance in each category may be used to calculate an overall performance rating (e.g., a number from 0 to 1), wherein operation 114 may include comparing performance ratings of various models.

If the current student model's performance is superior to performance of the set of previous models (114 "No"), method 100 returns to operation 105 to generate and evaluate another student model. This way, student models are continuously generated (via model selection, pruning, and training) and evaluated so long as performance increases. Operation 114 may default to 114 "No" if the current student model is the first student model generated. Once the current student model is worse than previous model(s) (114 "Yes"), the loop may be exited and method 100 may conclude via selecting a model with a highest performance at operation 116. "Highest performance," as used herein, may refer to the model with the maximum performance in one or more evaluated categories (e.g., fastest inference speed, highest accuracy, lowest resource requirements, etc.). Where different models excel in different categories, one may be prioritized over the others (e.g., accuracy), so long as the corresponding best model still meets minimum performance requirements in the remaining categories. Other criteria for selecting a "highest performance" model are also considered, as will be appreciated by one of ordinary skill in the art. For example, a student model's performance in each category may be assigned a quantifiable rating (e.g., ranging from 0 to 1). The performance requirements may be represented by ratings in a similar manner. A difference between the minimum required rating and each model's rating may be determined, and the model with the highest total difference (or highest average difference, etc.) may be selected.

Looping through operations 105-114 advantageously enables a system performing method 100 to generate a machine learning model optimized for specific performance requirements, such as hardware specifications of a device. In some embodiments, the loop must be performed a minimum number of times before method 100 can proceed to operation 116. In some embodiments, other conditions for exiting the loop may exist, such as, for example, whether the current student model exceeds a set of performance goals (e.g., a higher threshold based on the performance requirements), whether a maximum number of models have been attempted or exceed the performance requirements, etc. Different conditions may be utilized in different use cases.

Figure 2:
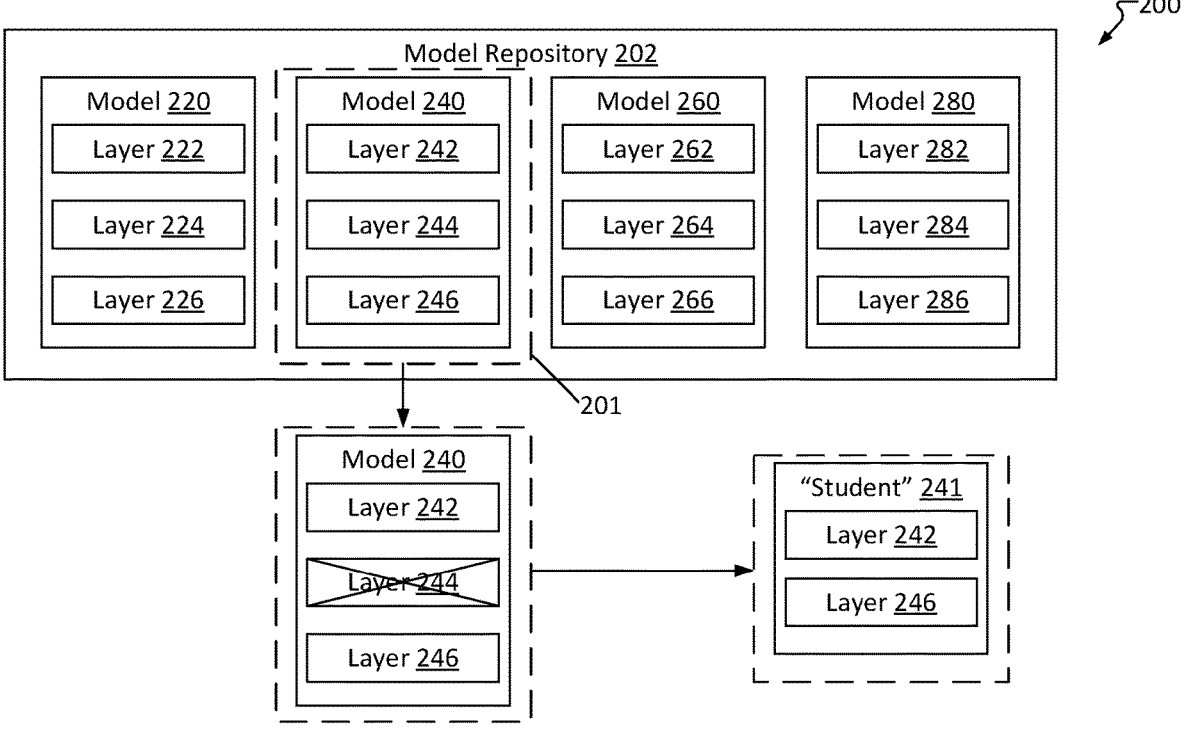
FIG. 2 is an example diagram of selecting and pruning a model to generate a student model, consistent with several embodiments of the present disclosure.

FIG. 2 is an example diagram 200 of selecting and pruning a model to generate a student model, consistent with several embodiments of the present disclosure. Machine learning model repository 202 includes a set of machine learning models 220, 240, 260 and 280 (collectively "models 220-280"). Repository 202 may comprise, for example, an online database of vetted trained models. Models 220-280 may each be a different kind of model (for example, model 220 may be a convolutional neural network, model 280 may be a recurrent neural network, etc.), or some (or even all) of models 220-280 may be the same kind of model. Models 220-280 may be trained to perform various tasks, such as image recognition, natural language processing, etc.

Each of models 220-280 include one or more layers. Model 220 includes layers 222, 224, and 226, model 240 includes layers 242, 244, and 246, model 260 includes layers 262, 264 and 266, and model 280 includes layers 282, 284 and 286 (collectively, layers 222-286). Layers 222-286 are configured to receive an input of data, manipulate the data, and produce an output. The input to each layer may either be an initial input dataset at a first layer (i.e., layer 222, 242, 262 or 282) or a feature vector output from an earlier layer.

One of models 220-280 may be selected for usage as a student model. In the example depicted in FIG. 2, model 240 has been selected, as indicated by dashed boxes 201. In some embodiments, various selection criteria may be implemented to attempt to select an "ideal" initial model, such as an accuracy:layer count ratio, memory footprint, inference speed, etc. However, in some embodiments, random selection may be beneficial due to it being relatively simple to implement and fast to execute. Further, due to the unpredictable impact of the pruning and training processes, random selection may still be comparably effective. The selection of model 240 may be performed in a manner similar to that described with respect to operation 104 of method 100, discussed above in relation to FIG. 1.

Once model 240 is selected, it is pruned; in the example depicted in FIG. 2, model 240 has layer 244 deleted, such that the resulting student model 241 only has layer 242 and layer 246. This may result in student model 241 having a smaller size and resource requirements when compared to the "original" model 240. The selection of layers to be deleted may be performed in a manner similar to operation 106 of method 100, discussed above in relation to FIG. 1. The specific layers deleted may be selected at random or based on one or more criteria. For example, one or more continuous blocks (with a minimum size of 10% of the total number of layers) may be selected at random, the central 20 layers may be selected, etc. The number of layers deleted may also be determined at random, although bounds may be set depending upon performance requirements. For example, a 150-layer model selected as the basis for a student model to be implemented on a mobile device may have 100 layers deleted, while the exact layers deleted may be chosen at random.

It is important to note that models 220-280 are likely to have significantly more than three layers; machine learning models commonly have several hundred layers. However, models 220-280 are depicted as having only three layers each for ease of explanation. Similarly, while student model 241 has fewer layers than model 240, student model 241 still may have significantly more than two layers (possibly still even hundreds). On the other hand, while student model 241 is depicted as only missing a single layer compared to models 220, 240, 260, and 280, student model 241 may notably have substantially fewer layers than any of models 220-280. Further, models 220-280 may not necessarily have the same structure; as an illustrative example, rather than 4 models with 3 layers each and a student model with 2 layers, some use cases may involve 15 teacher models, each having a different numbers of layers (but all 15 having at least 200 layers) and a student model with 30 layers.

The pruning may result in significant resource-based performance improvements. In other words, after the pruning, student model 241 may be significantly more "lightweight" than model 240. For example, student model 241 may consume significantly less memory to operate than model 240. With that said, the pruning may also result in significant accuracy penalties to student model 241 when compared to model 240. This is because connections and ordering of layers can be a crucial component of a model's effectiveness, to the extent where even minor changes to the order of the layers can have a major impact on the model's accuracy. Since the pruning includes deleting several layers, student model 241's accuracy is likely to be severely reduced as a result. However, these penalties can be advantageously mitigated via special training, such as that described below with reference to FIG. 3.

Figure 3:
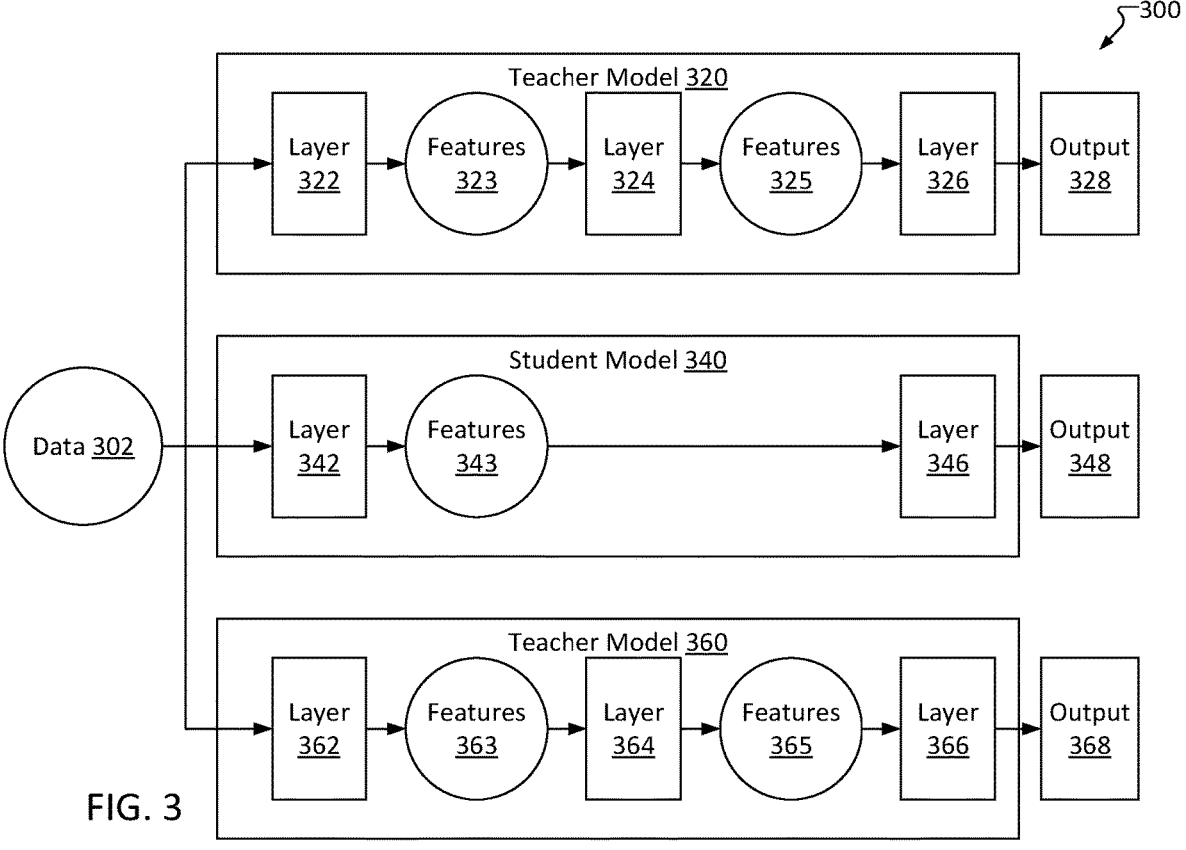
FIG. 3 is an example diagram of a data flow for training a student model based in part on training data and on multiple teacher models, consistent with several embodiments of the present disclosure.

FIG. 3 is an example diagram 300 of a data flow for training a student model 340 based in part on training data 302 and on multiple teacher models 320, 360, consistent with several embodiments of the present disclosure. This training can result in substantially improved accuracy of the student model which may advantageously mitigate accuracy penalties suffered due to pruning. Training data 302 may be known, annotated data, such as, for example, a series of x-ray images depicting particular pathologies (possible cancerous growths, broken bones, etc.), a series of electroencephalography (EEG) charts of patients with diagnosed conditions, etc.

Teacher models 320 and 360 may be established/pretrained models selected from a model repository. For example, teacher models 320 and 360 may correspond to models 220 and 260 of model repository 202 as described above with reference to FIG. 2.

Data 302 may be input to several models, such as teacher models 320 and 360 as well as student model 340. For example, data 302 may be input into first layer 322 of model 320. Layer 322 may generate features 323 (such as in the form of a feature vector), which may then be input into layer 324. Similarly, layer 324 may manipulate features 323 and, in turn, generate output features 325. Features 325 may then be input into final layer 326, resulting in output 328. In some embodiments, output 328 may be compared to labels of data 302 to check an accuracy of teacher model 320. However, teacher model 320's accuracy may be assumed to be sufficient for purposes of training student model 340 (thus making comparing output 328 to data 302 unnecessary).

Similarly, data 302 may be input into first layer 362 of model 360. Layer 362 may generate output features 363, which may then be input into layer 364. Similarly, layer 364 may manipulate features 363 and, in turn, generate output features 365. Features 365 may then be input into final layer 366, resulting in output 368. In some embodiments, output 368 may be compared to data 302 to check an accuracy of teacher model 360. However, teacher model 360's accuracy may be assumed to be sufficient for purposes of training student model 340 (thus making comparing output 368 to data 302 unnecessary).

Data 302 may also be input into first layer 342 of student model 340. First layer 342 may manipulate input data 302 and generate first output features 343. These features may then be input into layer 346 in order to generate student output 348. Output 348 may be compared to known values of input data 302, and adjustments may be made to layers 342 and 346 based on the comparison. However, features 343 may also be compared with one or more of features 323, 325, 363, and 365. Further, adjustments to layers 342 and 346 may be based, at least in part, on these comparisons. For example, if a difference between features 342 and features 323 is relatively high, then a magnitude of a change made to a weight of layer 342 may be relatively high. This may advantageously enable training student model 340 to function in a similar manner to teacher models 320 and 360 (despite teacher models 320 and 360 being substantially more complex, with more layers), with minimal cost to accuracy (as output 348's comparison to data 302 is still considered when layers 342/346 are adjusted).

Throughout this disclosure, reference is made to data in various forms, particularly "labeled" vs. "unlabeled" data. "Labeled" data is further broken into groups: "hard"-labeled data (typically received from outside sources) and "weak"-labeled data. In general, hard-labeled data refers to data that has already been classified, annotated, or is otherwise known and understood. For example, in the context of image recognition, known data may be an image including information (i.e., metadata) detailing items or objects depicted in the image. As an additional example, an electrocardiogram (ECG or EKG) received from a public health database including metadata describing the ECG as a normal heart rhythm (vetted by one or more medical professionals) may be hard-labeled data. Hard-labeled data may be publicly available from various sources, such as model training databases, artificial intelligence (AI) communities, and the like. Data without annotation or a label is referred to as "unlabeled" data. As a non-limiting example, raw sensor data may be unlabeled data.

"Weak"-labeled data, as used herein, refers to previously unlabeled data that has been labeled by means other than manual annotation by a human professional, such as via the systems and methods consistent with the present disclosure. The "weak" moniker may allude to the fact that the data has not been labeled via a traditional manner such as manual annotation and has not been confirmed to be correctly labeled.

Further, "data," as used herein, may refer to "input data" (such as data recorded from a device) or "feature data" (such as output from an intermediate layer of a machine learning model). As an example, an ECG ("input data") may be input into a first layer of a model, which may output a feature vector containing multiple features ("feature data"). The feature vector may then be input to a second layer of the model, which may in turn output a second feature vector (whose features are also feature data), and so on. Input data is either labeled or unlabeled. Feature data generated from labeled input data may inherit the same label. For example, a labeled ECG may be converted into a first feature vector by a first model layer. The first feature vector can then be labeled based on the label of the ECG, resulting in labeled feature data. Thus, obtaining data may refer to receiving input data (such as by, for example, collecting patient data or downloading labeled data) or generating feature data (by inputting feature data into a model and fetching feature data output from a layer of the model).

Figure 4:
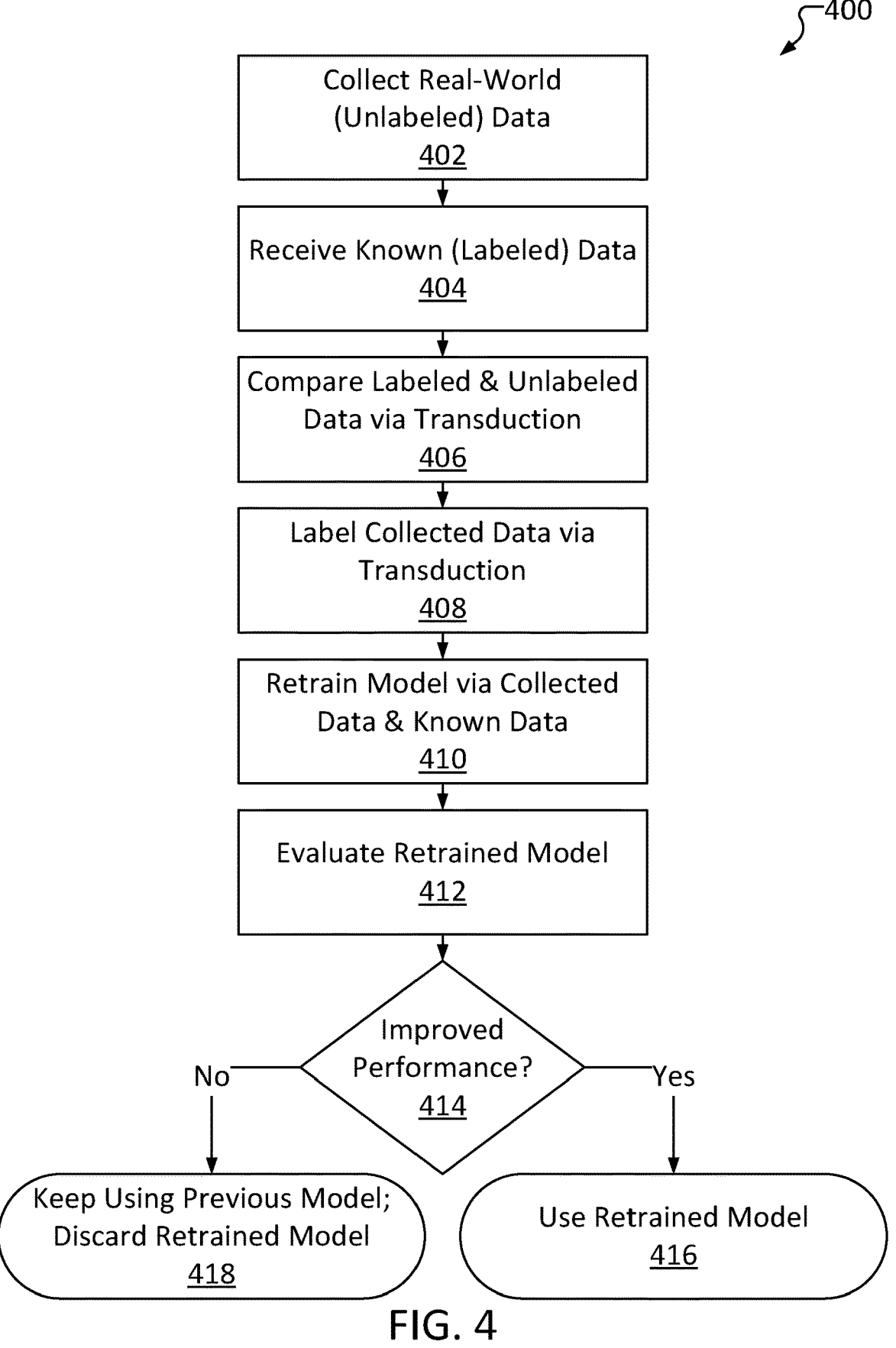
FIG. 4 illustrates a high-level method of updating a machine learning model based on unlabeled data, consistent with several embodiments of the present disclosure.

FIG. 4 illustrates a high-level method 400 of updating a machine learning model based on unlabeled data, consistent with several embodiments of the present disclosure. Method 400 may be performed by, for example, a device having a machine learning model installed thereon, such as a computer. Method 400 comprises collecting data at operation 402. Operation 402 may include, for example, recording data via one or more sensors. The data collected at operation 402 may be unlabeled input data. For example, operation 402 may include receiving electroencephalography data (e.g., an image of an EEG reading of data from a set of electrodes). Whether the EEG data depicts normal brain activity or, for example, a seizure, is initially unknown, because the data is unlabeled.

Method 400 further comprises receiving known data at operation 404. Operation 404 may include, for example, downloading a dataset from an online database, loading one from a local storage device, or the like. The known data may include a set of measurements that have been annotated, such as by a professional/specialist. This known data also referred to herein as "hard"-labeled data. Operation 404 may include receiving a single dataset or multiple datasets.

Method 400 further comprises comparing the labeled data with the unlabeled data at operation 406. Operation 406 may include, for example, computing a difference between datapoints of the unlabeled data set and datapoints of the labeled data set(s). In some embodiments, operation 406 may include clustering the data. As a non-limiting high-level example, each datapoint of a dataset may be represented as an X-Y coordinate pair, wherein operation 406 may include plotting each datapoint to recognize groups, or "clusters," of datapoints near each other in the X-Y plane. As a more specific example, a labeled, publicly available group of EEG images depicting various states of brain functionality (each image functioning as a "datapoint" corresponding to a single reading) may be plotted such that similarly labeled EEG images are in proximity with one another. In other words, EEG images that are labeled as depicting normal brain function may be plotted in a first cluster, EEG images that are labeled as depicting a first type of seizure may be plotted in a second cluster, EEG images that are labeled as depicting a second type of seizure may be plotted in a third cluster, and so on. The algorithm used to plot the various labeled images may be repeatedly modified until the images are clustered according to their labels. Then, images from the unlabeled data may be plotted and organized into clusters using the same algorithm. An example of such a comparison is provided in diagram 500 of FIG. 5. Operation 406 may include comparing the labeled and unlabeled data via a transduction algorithm.

Some clusters identified via operation 406 may not include any datapoints from the unlabeled dataset. As an example, a first cluster may include known datapoints which are each ECGs labeled as "normal heart rhythm," a second cluster may include known datapoints which are each ECGs labeled as "atrial fibrillation," a third cluster may include known datapoints which are each ECGs labeled as "ventricular fibrillation," and unlabeled data may be a set of ECGs measured for a specific patient. The unlabeled dataset (e.g., the patient's ECGs) may include some datapoints in the first cluster and some datapoints in the second cluster but no datapoints in the third cluster. If the patient is relatively healthy with no history of cardiac problems, the unlabeled data may not be expected to include ECGs depicting ventricular fibrillation (as ventricular fibrillation is typically followed by cardiac arrest and is usually fatal).

Method 400 further comprises labeling the collected data at operation 408. Operation 408 may include determining a label for each datapoint included in the unlabeled dataset received via operation 402. Operation 408 may include determining labels based on the comparison of operation 406. For example, operation 408 may include inferring labels for each datapoint based upon the labels of most-similar datapoints from the known datasets received. In some embodiments, operation 408 may be performed by a computer system implementing a transduction algorithm. As the labels determined via operation 408 are not determined in a "traditional" manner (such as via manual analysis and annotation by a professional), the labels determined via operation 408 may be considered "weak" labels.

In some embodiments, outputs of teacher models can be considered weak labels. As an illustrative example, the unlabeled data may be input into a teacher model which may in turn output a vector containing 7 entries representing probabilities for 7 target classes (pertaining to a 7-class seizure type classification). An argmax operation can be applied on this vector to find the index of the highest probability. This index of the vector may be considered the most probable class of the unlabeled data and therefore can be treated as a weak/synthetic label.

As an example, a first unlabeled EEG image (e.g., collected patient data obtained via operation 402) may be in a first cluster, the first cluster also including several labeled images (e.g., EEG images from known "hard"-labeled datasets received via operation 404). Operation 408 may include identifying that each of the labeled EEG images in the first cluster are all labeled as "normal brain activity" and thus assigning that first label to the first unlabeled image (and any other unlabeled datapoints within the first cluster). Thus, the first unlabeled EEG image may be assigned a "weak" label identifying the image as depicting "normal brain activity."

Operation 408 may further include assigning the determined labels to the dataset (such as by adding metadata including the labels to the dataset). The metadata may further indicate that the labels are "weak" labels.

In some instances, not every datapoint may be labeled; for example, an unlabeled datapoint may lie outside or directly between clusters identified via operation 406 (an "unlabeled outlier"). The procedure(s) for handling unlabeled outliers may vary depend on the embodiment/use case. For example, in some embodiments, operation 408 may further include discarding unlabeled outliers from the unlabeled dataset. In some embodiments, operation 408 may further include labeling unlabeled outliers based on a "best guess" (e.g., closest cluster to the outlier), or operation 408 may include performing an additional "pass" to attempt to label the outliers, such as by implementing a different algorithm (e.g., nearest-neighbor). A datapoint may be considered an "outlier" based on a threshold comparison; a difference threshold can be defined describing a maximum difference between an unlabeled datapoint and labeled datapoints (or the center of a cluster). If the unlabeled datapoint differs from the closest labeled datapoint (or closest cluster of labeled datapoints) by an amount greater than the difference threshold, the unlabeled datapoint may be considered an outlier.

Method 400 further comprises retraining a machine learning model at operation 410. The machine learning model may have already been trained to analyze or classify input data such as the data collected via operation 402. As the nature of the input data changes, the model may lose accuracy over time, which can be alleviated by retraining. In particular, operation 410 may include using the weak-labeled data as training data for retraining a machine learning model. For example, operation 410 may include inputting the weak-labeled data to the model, receiving an output from the model, calculating an error between the output and the label, adjusting layers of the model based on the error, and repeating until the error no longer decreases. In some embodiments, operation 410 further includes training the model using a hard-labeled dataset in addition to the training using the weak-labeled data. Further, in some embodiments, hard-labeled data may be input into a teacher model to yield a teacher output, and the student model may be retrained based on the hard-labeled data and the weak-labeled data in view of the teacher output, in a manner similar to operation 108 of method 100.

Operation 410 may be performed on a "working copy" of the model, leaving a "live" version of the model unchanged, in view of the possibility that the retraining may not improve performance (or may even degrade performance). In some instances, the weak-labeled data and hard-labeled data may be combined into an aggregate training dataset, and the aggregate training dataset may be utilized to retrain the model. In some instances, the weak-labeled data may be used to train a first student model while the hard-labeled data may be used to train a second student model, wherein the two student models may later be combined into an ensemble model.

Method 400 further comprises evaluating the trained model at operation 412. Operation 412 may include, for example, inputting hard-labeled data into the retrained model, receiving an output, and determining an accuracy of the retrained model. Operation 412 may include evaluating the model using "evaluation data," referring to hard-labeled data that was not utilized for retraining the model as part of operation 410.

Method 400 further comprises determining whether performance of the retrained model is improved or reduced relative to performance of the previous version of the model (the "live" model) at operation 414. Operation 414 may include, for example, comparing an accuracy of the retrained model to an accuracy of the live model. For example, the retrained model may correctly classify 98% of the evaluation data at operation 412. If the live model had an accuracy of 95%, the retrained model is considered superior (414 "Yes") due to having a higher accuracy. Other performance metrics (besides accuracy) may be considered, such as f1 score, sensitivity, specificity, etc. For example, operation 414 may include comparing a sensitivity of the retrained model to a sensitivity of the live model.

If the retrained model results in an improved performance (414 "Yes"), method 400 further comprises replacing the live model with the retrained model at operation 416. Operation 416 may include, for example, updating layers of the model based on changes made when retraining the model at operation 410. In some use cases, an older version of the model may be archived to enable a rollback if necessary. As an illustrative example, the evaluation at 412 may not necessarily exhaustively test performance of the model in every aspect, so there exists a chance that the retrained model may have worse performance in some contexts (e.g., relatively poor accuracy when presented with a specific subtype of input data, such as an ECG depicting a rare presentation of atrial fibrillation, that was not represented in the evaluation data). Thus, there may be a benefit to retaining a backup of one or more previous iterations of the model in case the retrained model is later discovered to be insufficient. However, in some instances, storage space constraints of a device running the model may prevent use of backups (though they still may be maintained elsewhere, such as on a cloud server).

If the retrained model does not result in improved performance relative to the live model (414 "No"), method 400 further comprises discarding the retrained model and continuing to use the live model at operation 418.

Method 400 may be performed in response to user input (for example, a user may cause a device or system to perform method 400). In some embodiments, method 400 may be performed periodically, such as every 3 months, every week, etc. Retraining including use of the weak labeled data advantageously enables a system performing method 400 to update a machine learning model. In particular, the "real-world" nature of the weak labeled data advantageously enables updating a machine learning model to remain robust and accurate even in the face of shifting input data. For example, as a user's physiology changes over time, data input into the model may include patterns that the model has not been trained on. However, since underlying patterns may remain consistent, method 400 can advantageously enable updating a model to remain accurate even when presented with new patterns and without requiring additional professional data analysis or annotation.

In some embodiments, the retrained model may also be compared to resource requirements based on hardware specifications of a device. If the retrained model's resource overhead exceeds the requirements, the retrained model may be pruned and retrained again. This may be performed in a manner similar to operations 112, 105 and 106 of method 100 (discussed above with reference to FIG. 1). This may advantageously enable retraining an existing model to both perform better (e.g., with a higher accuracy) and function within resource requirements.

Figure 5:
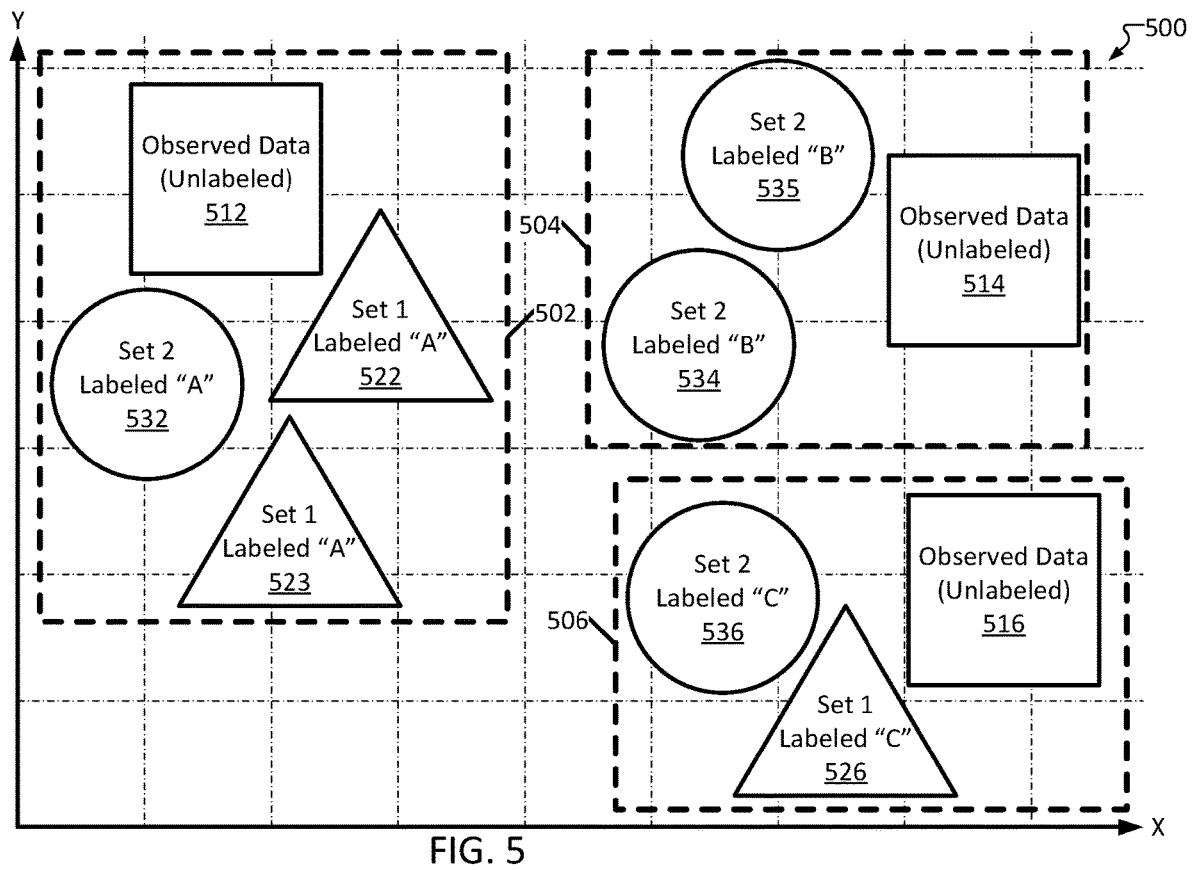
FIG. 5 is a diagram depicting an illustrative example of how unlabeled observed data can be automatically labeled based on known datasets, consistent with several embodiments of the present disclosure.

FIG. 5 is a diagram 500 depicting an illustrative example of how unlabeled observed data can be automatically labeled based on known datasets, consistent with several embodiments of the present disclosure. Diagram 500 can depict semi-supervised machine learning processes such as, for example, transduction. Diagram 500 may represent a 2D plot of the datapoints, generated by, for example, assigning (X,Y) coordinates to the various datapoints. Diagram 500 includes shapes from three different datasets: an observed and unlabeled dataset including datapoints 512, 514 and 516 (depicted in FIG. 5 as squares), a first set of known "hard"-labeled datapoints 522, 523, and 526 (depicted in FIG. 5 as triangles), and a second set of known hard-labeled datapoints 532, 534, 535 and 536 (depicted in FIG. 5 as circles). For example, the observed dataset may be EEG scans of a patient (i.e., datapoint 512 may be a first set of EEG data from a first patient recording, datapoint 514 may be a second set of EEG data from a second recording with the same patient, etc.). Further, the first set of hard-labeled datapoints may be a first group of publicly available EEG datasets with known results. For example, datapoint 522 may be an EEG scan that has been identified to depict a first type of seizure, datapoint 523 may be a different EEG scan that has also been identified by an expert to depict a seizure of the first type, while 526 may be an EEG scan that has been identified to depict normal brain activity. The second set of hard-labeled datapoints may be a different group of annotated EEG scans (possibly from a different source). Use of more than two labeled datasets is also considered, and may aid in labeling and retraining. In some embodiments, the first dataset may be utilized to retrain a model while the second dataset may be utilized to evaluate performance (i.e., accuracy) of the retrained model.

Diagram 500 may represent a 2D plot of the datapoints, generated by, for example, assigning (X,Y) coordinates to the various datapoints. The X and Y values may be assigned via an algorithm, and the algorithm may be repeatedly modified until datapoints from the labeled groups are plotted in distinct clusters with similarly labeled datapoints. For example, a set of labeled EEGs may include several EEGs labeled as depicting a first type of seizure ("seizure EEGs") and several EEGs labeled as depicting normal brain activity ("normal EEGs"). A first iteration of the algorithm may plot each of these EEGs with an X coordinate determined based on the EEG's file size and a Y coordinate determined based on the EEG's date of creation, but this is unlikely to result in the seizure EEG's being plotted near one another (or the normal EEG's being plotted near one another). Thus, the algorithm may be modified to determine (X,Y) coordinates differently and be revaluated, and this process may be repeated until all seizure EEGs are plotted within a first region of a given radius without any nearby normal EEGs (a first cluster) and all normal EEGs are plotted within a second region of the same radius without any nearby seizure EEGs (a second cluster). Once the algorithm reliably plots labeled datapoints near one another, it can be assumed that it will plot unlabeled datapoints appropriately (e.g., it can be assumed that unlabeled EEGs that depict normal brain activity will be plotted in the second cluster).

It is noted that the (X,Y) coordinates do not necessarily represent distinctive properties of the EEGs; they may appear to an outside observer as arbitrary. In other words, diagram 500 is not necessarily a plot of the data in terms of well-understood metrics such as average, frequency, magnitude, etc. Put simply, the axes are whatever they need to be; so long as the algorithm results in plotting datapoints having the same label within the same cluster, then a system may have relatively high confidence that the same algorithm will plot unlabeled data within the appropriate cluster.

Notably, the datapoints in diagram 500 are all relatively segregated into separate groups, or "clusters," such that members of a given cluster are all located relatively near one another. In the example diagram 500, datapoints 512, 522, 523 and 532 are in cluster 502, datapoints 514, 534 and 535 are in cluster 504, and datapoints 516, 526, 536 are in cluster 506. The various hard-labeled datapoints also each have 1 of 3 different labels: "A," "B," and "C." Further, all of the known labels of each given cluster in diagram 500 are equal; datapoints 522, 523 and 532 are all labeled "A," etc. This may be a result of how the datapoints are plotted.

The various datapoints may be assigned coordinates by inputting values of the datapoints into an algorithm, receiving coordinates as output of the algorithm, plotting the datapoints according to the output coordinates, and adjusting the algorithm until datapoints of a particular value are plotted in relative proximity to one another. This way, when values of the unlabeled datapoints are input into the algorithm, the clusters containing their resulting position are likely to correspond to the datapoint's "correct" label. For example, as unlabeled datapoint 512 is plotted in cluster 502, and because the plotting algorithm favors plotting "A"-labeled datapoints in cluster 502, it can be inferred that datapoint 512 should be labeled "A." This process can be repeated for each datapoint in the unlabeled dataset, resulting in "weak" labels for the dataset, advantageously enabling retraining a model based on observed data.

As a non-limiting example, "A" may refer to a first type of seizure, while "B" may refer to normal brain activity and "C" may refer to a second type of seizure. Thus, the algorithm may have plotted all EEGs depicting the first type of seizure within cluster 502, all EEGs depicting normal brain activity within cluster 504, and all EEGs depicting a second type of seizure within cluster 506. The algorithm can be verified to be reliably sorting EEGs even if the exact nature of the sorting appears arbitrary/is poorly understood (e.g., the X and Y axes do not correspond to familiar properties of the data). Thus, when the same algorithm plots an unlabeled EEG in cluster 502, it may be inferred that the unlabeled EEG depicts the first type of seizure, and so on.

Figure 6:
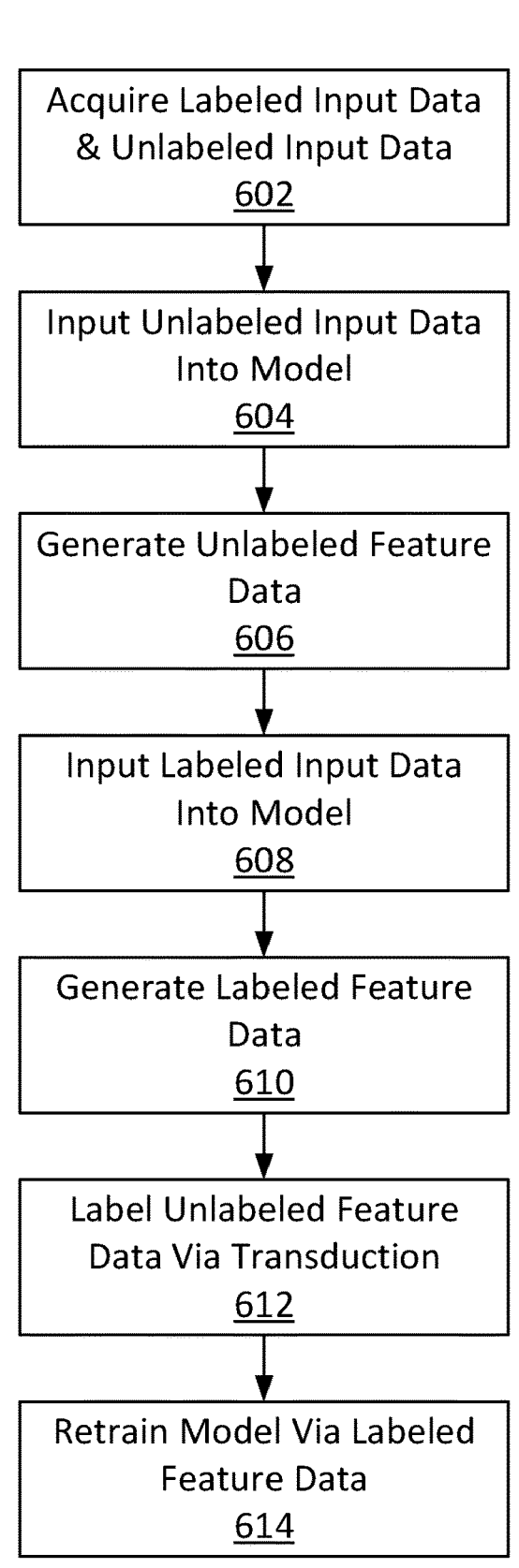
FIG. 6 illustrates a high-level method of updating a machine learning model based on deidentified feature data derived from unlabeled input data, consistent with several embodiments of the present disclosure.

FIG. 6 illustrates a high-level method 600 of updating a machine learning model based on de-identified feature data derived from unlabeled input data, consistent with several embodiments of the present disclosure. In general, method 600 includes several operations that may be substantially similar to operations performed in method 400. However, method 600 retrains a model based on unlabeled "de-identified" features (i.e., feature data) that are themselves based on collected data (i.e., input data). This may be advantageous if, for example, data collected by a device performing method 600 may be of a sensitive nature, such as personally identifiable information (PII), health information, etc.

Method 600 comprises acquiring labeled input data and unlabeled input data at operation 602. Operation 602 may include, for example, recording unlabeled data via one or more sensors and downloading a labeled dataset from an online database, loading one from a local storage device, or the like. For example, operation 602 may include receiving unlabeled electroencephalography data from a set of electrodes and downloading one or more labeled EEG datasets from a public database.

Method 600 further comprises inputting the unlabeled input data into a machine learning model at operation 604. Operation 604 may be performed in a manner substantially similar to (or as part of) normal operation of a machine learning model, such as a machine learning model executing on a device performing method 600.

Method 600 further comprises generating unlabeled feature data (i.e., one or more unlabeled features) at operation 606. The machine learning model may include multiple "intermediate" layers, which each receive input features, manipulate them, and produce output features which are then input into a subsequent layer. Operation 606 may include receiving features output from one of these layers. In general, the features themselves may be relatively "abstract," in that, outside of being used as input to the next layer of the machine learning model, they may be essentially unintelligible/meaningless. This is a ramification of the nature of how machine learning models are trained (by repeatedly adjusting various layers). To human observers, and even to different machine learning models, the intermediate layers (sometimes referred to as "hidden layers") function as a "black box." However, they are typically deterministic (though this may vary depending upon the model), and trends in the input data will generally still be reflected in these intermediate features. Thus, intermediate features of the machine learning model present a viable alternative to raw data when the raw data may be of a sensitive nature. Further, features produced at high-level or intermediate layers of the model may capture useful information from raw input data (e.g., edges, corners, homogeneous patches, etc.), and therefore may advantageously be more effective for differentiating target classes compared to the input data. In some embodiments, the machine learning model may be configured to output a specific feature vector in addition to or instead of its typical output. For example, a machine learning model with 50 layers may be configured to output the feature vector generated by the 37th layer in addition to its final output. The feature vector of the 37th layer may then be utilized as the "generated unlabeled feature data" of operation 606.

Method 600 further comprises inputting the labeled input data into the same machine learning model at operation 608. Operation 608 may be performed in a substantially similar manner to operation 604. The label of each input datapoint may be retained or cached in order to enable labeling the corresponding generated feature data.

Method 600 further comprises generating labeled feature data at operation 610. Operation 610 may be performed in a substantially similar manner to operation 606. In addition, the generated features may be labeled based on the label associated with the corresponding input data.

Method 600 further comprises labeling the unlabeled feature data based on comparisons between the labeled and unlabeled features at operation 612. Operation 612 may include, for example, comparing the unlabeled features and the labeled features, computing a difference between the unlabeled features and the labeled features in a manner substantially similar to operation 406 of method 400. Operation 612 may further include determining a label for each feature included in the unlabeled features generated via operation 606 in a manner substantially similar to operation 408 of method 400. While the various features may be significantly different from the initial input data the features are generated from, due to the nature of the machine learning models, comparisons between the labeled features and unlabeled features are still similarly useful, enabling labeling the unlabeled feature data in a similar manner (such as by plotting features into clusters, similar to the example discussed with reference to FIG. 5).

Method 600 further comprises retraining the machine learning model via the newly labeled ("weak"-labeled) feature data at operation 614. In some embodiments, operation 614 may further include retraining via the hard-labeled feature data and feature data from one or more teacher models. Operation 614 may include, for example, inputting the weak-labeled features to the "next layer" of the model. As an example, the now-labeled feature data generated at operation 606 may be output from a 37th layer of a 50-layer model. Operation 614 may include inputting the weak-labeled feature data into the 38th layer of the model, receiving an output from the model, calculating an error between the output and the label, adjusting one or more of layers 38-50 of the model based on the error, and repeating until the error no longer decreases. In some embodiments, operation 614 further includes training the model using a hard-labeled dataset in addition to the training using the weak-labeled feature data.

Operation 614 may be performed on a "working copy" of the model, leaving a "live" version of the model unchanged, in view of the possibility that the retraining may not improve performance (or may even degrade performance). The model may then be evaluated and updated, if appropriate, in a manner substantially similar to operations 412-416 of method 400. In some embodiments, hard-labeled data may be input into a teacher model to yield a teacher output, while a combination of hard-labeled data and weak-labeled data may be used to retrain the student model in conjunction with the teacher output. In some embodiments, operation 614 may include retraining using composite knowledge distillation, such as via method 100.

Figure 7:
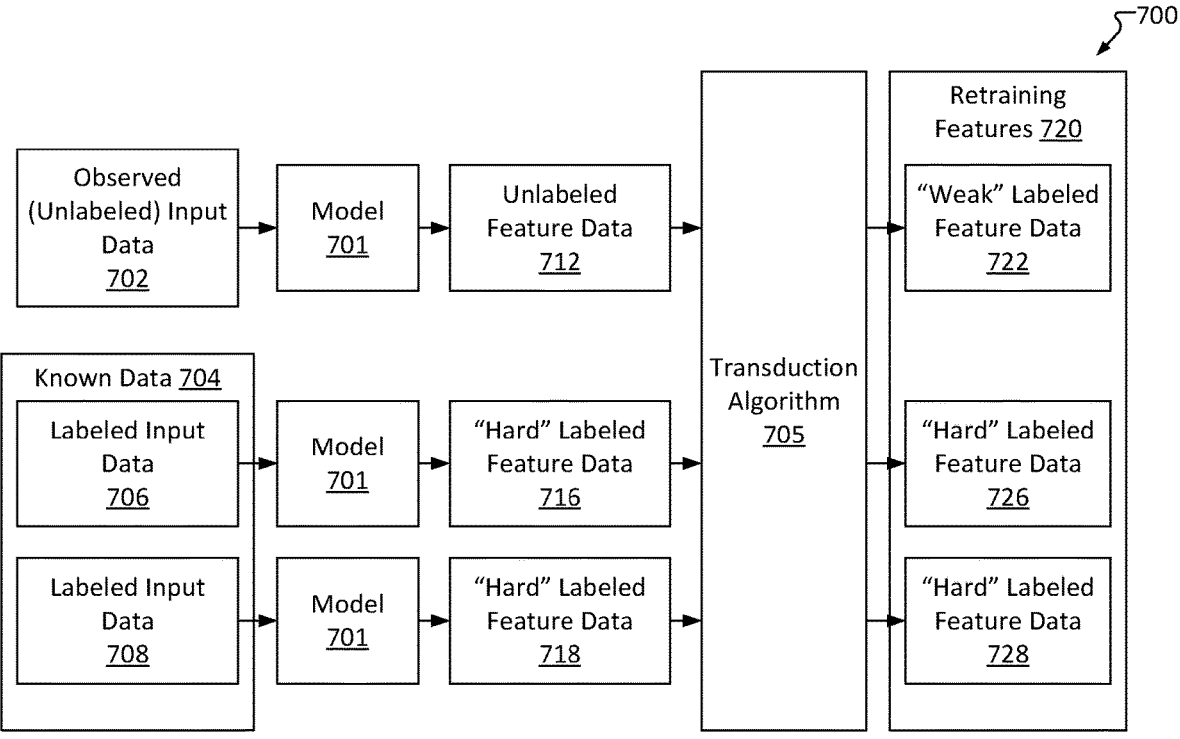
FIG. 7 is a diagram depicting an example of labeling unlabeled input data via transductive learning, consistent with several embodiments of the present disclosure.

FIG. 7 is a diagram 700 depicting an example of labeling unlabeled input data (such as sensor data) via transductive learning, consistent with several embodiments of the present disclosure. Diagram 700 is presented as an illustrative example of how method 600 might be performed. Unlabeled input data 702 may be collected via observation, such as from one or more sensors. Unlabeled input data 702 is input into a machine learning model 701. Model 701 may output unlabeled feature data 712.

Known data 704 may include multiple datasets, such as first labeled input data 706 and second labeled input data

708. Both input datasets 706 and 708 are input into model 701, resulting in labeled feature data 716 and labeled feature data 718, respectively. To clarify, model 701 may be executed multiple times for each dataset. For example, each of input datasets 702, 706 and 708 may include 5 datapoints. Thus, model 701 may be executed 15 times; once for each unlabeled input datapoint of unlabeled input dataset 702 (resulting in 5 features 712), once for each labeled input datapoint of known input dataset 706 (resulting in 5 labeled features 716), and once for each labeled input datapoint of known input dataset 708 (resulting in 5 labeled features 718). These iterations of model 701 may be performed in any order.

Notably, model 701 may ordinarily be configured to output a classification (not shown in FIG. 7), but for purposes of updating model 701, model 701 may be reconfigured to output specific intermediate features (such as unlabeled feature data 712) in addition to/instead of the classification. This reconfiguration may be temporary or permanent. In some embodiments, a system may be configured to fetch a layer's output without reconfiguring model 701. The specific feature data output may vary between update attempts, so long as the same feature is utilized for each dataset (unknown and known) within the same attempt. For example, a first update attempt, such as a first iteration of method 600, may be performed wherein model 701 is configured to output a feature vector generated by a 42nd layer. A second update attempt, such as a second iteration of method 600, may be performed wherein model 701 is configured to output a feature vector generated by a 37th layer.

Unlabeled feature data 712, Hard labeled feature data 716 and hard labeled feature data 718 are input into a transduction algorithm 705. Transduction algorithm 705 may, for example, organize each of features 712-716 into clusters, wherein each cluster includes features with a particular label. Thus, each of unlabeled features 712 may be labeled based on inference (i.e., based on the cluster that each of features 712 is plotted into). This results in "weak" labeled features 722, which, in combination with hard labeled features 726 and hard labeled features 728, form retraining features 720 which can then be used to retrain and evaluate model 701.

Figure 8:
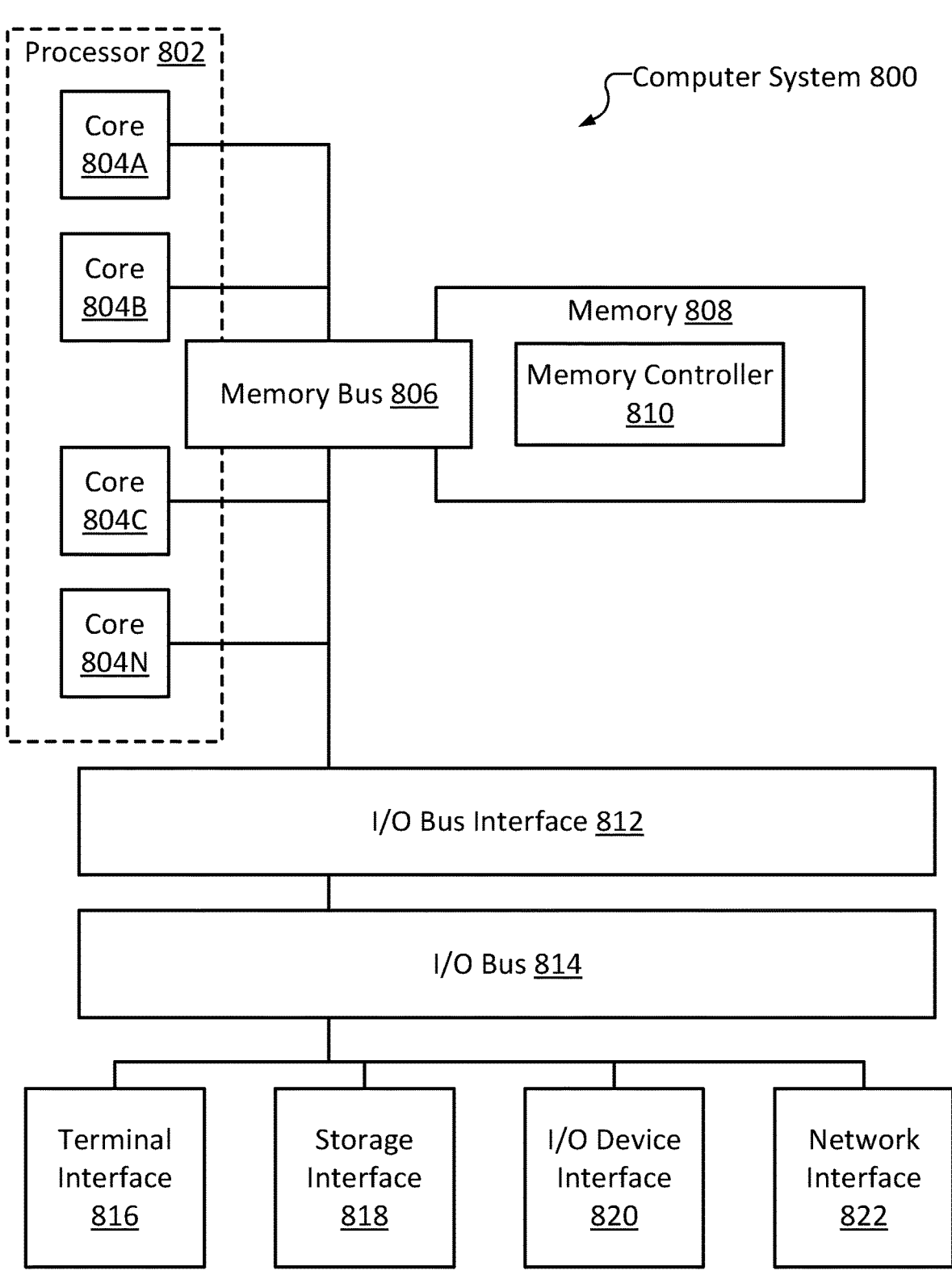
FIG. 8 illustrates a high-level block diagram of an example computer system that may be used in implementing embodiments of the present disclosure.

Referring now to FIG. 8, shown is a high-level block diagram of an example computer system 800 that may be configured to perform various aspects of the present disclosure, including, for example, methods 100, 400 and 600. The example computer system 800 may be used in implementing one or more of the methods or modules, and any related functions or operations, described herein (e.g., using one or more processor circuits or computer processors of the computer), in accordance with embodiments of the present disclosure. In some embodiments, the major components of the computer system 800 may comprise one or more CPUs 802, a memory subsystem 808, a terminal interface 816, a storage interface 818, an I/O (Input/Output) device interface 820, and a network interface 822, all of which may be communicatively coupled, directly or indirectly, for inter-component communication via a memory bus 806, an I/O bus 814, and an I/O bus interface unit 812.

The computer system 800 may contain one or more general-purpose programmable central processing units (CPUs) 802, some or all of which may include one or more cores 804A, 804B, 804C, and 804D, herein generically referred to as the CPU 802. In some embodiments, the computer system 800 may contain multiple processors typical of a relatively large system; however, in other embodiments the computer system 800 may alternatively be a single CPU system. Each CPU 802 may execute instructions stored in the memory subsystem 808 on a CPU core 804 and may comprise one or more levels of on-board cache.

In some embodiments, the memory subsystem 808 may comprise a random-access semiconductor memory, storage device, or storage medium (either volatile or non-volatile) for storing data and programs. In some embodiments, the memory subsystem 808 may represent the entire virtual memory of the computer system 800 and may also include the virtual memory of other computer systems coupled to the computer system 800 or connected via a network. The memory subsystem 808 may be conceptually a single monolithic entity, but, in some embodiments, the memory subsystem 808 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 804 may contain elements for control and flow of memory used by the CPU 802. This may include a memory controller 810.

Although the memory bus 806 is shown in FIG. 8 as a single bus structure providing a direct communication path among the CPU 802, the memory subsystem 808, and the I/O bus interface 812, the memory bus 806 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 812 and the I/O bus 814 are shown as single respective units, the computer system 800 may, in some embodiments, contain multiple I/O bus interface units 812, multiple I/O buses 814, or both. Further, while multiple I/O interface units are shown, which separate the I/O bus 814 from various communications paths running to the various I/O devices, in other embodiments some or all of the I/O devices may be connected directly to one or more system I/O buses.

In some embodiments, the computer system 800 may be a multi-user mainframe computer system, a single-user system, or a server computer or similar device that has little or no direct user interface but receives requests from other computer systems (clients). Further, in some embodiments, the computer system 800 may be implemented as a desktop computer, portable computer, laptop or notebook computer, tablet computer, pocket computer, telephone, smart phone, mobile device, or any other appropriate type of electronic device.

It is noted that FIG. 8 is intended to depict the representative major components of an exemplary computer system 800. In some embodiments, however, individual components may have greater or lesser complexity than as represented in FIG. 8, components other than or in addition to those shown in FIG. 8 may be present, and the number, type, and configuration of such components may vary.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method of selecting a machine learning model, the computer including one or more processors, one or more computer-readable memories and one or more computer-readable storage media, the method comprising:

receiving hardware specifications of a device;

receiving output-based requirements of the device;

determining a performance requirement based on the hardware specifications and the output-based requirements of the device;

acquiring a set of machine learning models from a repository of machine learning models accessible to the device, the set of machine learning models including:

a first machine learning model having a first set of layers, wherein each layer of the first set of layers manipulates input in a different way in order to produce its individual output; and a teacher model;

determining a threshold number of layers from the first set of layers to form a pruned set of layers;

deleting one or more layers of the first set of layers from the first machine learning model, resulting in a student model with the pruned set of layers having a number of layers at or below the threshold number of layers;

training the student model based on:

training data; and the teacher model;

evaluating a performance of the student model;

comparing the performance of the student model and the performance requirement;

determining, based at least on the comparing, to select a model having a highest performance; and deploying the model having the highest performance on the device, wherein each of the pruned set of layers is developed over time while training the student model.

2. The method of claim 1, further comprising receiving an additional performance requirement from a user, wherein the comparing further includes comparing the performance of the student model and the additional performance requirement.

3. The method of claim 1, wherein the deleting one or more layers includes:

determining, based on the performance requirement, a number of layers to delete;

selecting the one or more layers based on the number; and deleting the selected layers.

4. The method of claim 3, wherein the one or more layers are selected at random.

5. The method of claim 1, wherein the deleting one or more layers includes deleting one or more blocks, each block including a continuous set of layers.

6. The method of claim 1, wherein the training includes:

inputting training data into the student model and the teacher model;

receiving a student feature from the student model;

receiving a teacher feature from the teacher model;

performing a first comparison between the student feature and the teacher feature;

receiving a student output from the student model;

performing a second comparison between the student output and the training data; and adjusting at least one layer of the pruned set of layers of the student model based on the first comparison and the second comparison.

7. The method of claim 1, wherein each of the set of machine learning models are selected from a model repository.

8. A computer system for selecting a machine learning model, the system comprising:

one or more processors, one or more computer-readable memories and one or more computer-readable storage media;

program instructions, stored on at least one of the one or more storage media for execution by at least one of the one or more processors via at least one of the one or more memories, to receive hardware specifications of a device;

program instructions, stored on at least one of the one or more storage media for execution by at least one of the one or more processors via at least one of the one or more memories, to receive output-based requirements of the device;

program instructions, stored on at least one of the one or more storage media for execution by at least one of the one or more processors via at least one of the one or more memories, to determine a performance requirement based on the hardware specifications and the output-based requirements;

program instructions, stored on at least one of the one or more storage media for execution by at least one of the one or more processors via at least one of the one or more memories, to acquire a set of machine learning models from a repository of machine learning models accessible to the device, the set of machine learning models including:

a first machine learning model having a first set of layers, wherein each layer of the first set of layers manipulates input in a different way in order to produce its individual output; and a teacher model;

program instructions, stored on at least one of the one or more storage media for execution by at least one of the one or more processors via at least one of the one or more memories, to determine a threshold number of layers from the first set of layers to form a pruned set of layers;

program instructions, stored on at least one of the one or more storage media for execution by at least one of the one or more processors via at least one of the one or more memories, to delete one or more layers of the first set of layers from the first machine learning model, resulting in a student model with the pruned set of layers having a number of layers at or below the threshold number of layers;

program instructions, stored on at least one of the one or more storage media for execution by at least one of the one or more processors via at least one of the one or more memories, to train the first student model based on:

training data; and the teacher model;

program instructions, stored on at least one of the one or more storage media for execution by at least one of the one or more processors via at least one of the one or more memories, to evaluate a performance of the first student model;

program instructions, stored on at least one of the one or more storage media for execution by at least one of the one or more processors via at least one of the one or more memories, to compare the performance of the first student model to the performance requirement;

program instructions, stored on at least one of the one or more storage media for execution by at least one of the one or more processors via at least one of the one or more memories, to determine, based at least on the comparing, to generate a second student model; and program instructions, stored on at least one of the one or more storage media for execution by at least one of the one or more processors via at least one of the one or more memories, to deploy the model having the highest performance on the device wherein each of the pruned set of layers is developed over time while training the student model.

9. The system of claim 8, further comprising:

program instructions, stored on at least one of the one or more storage media for execution by at least one of the one or more processors via at least one of the one or more memories, to receive an additional performance requirement from a user, wherein the comparing further includes comparing the performance of the student model and the additional performance requirement.

10. The system of claim 8, wherein the deleting one or more layers includes:

determining, based on the performance requirement, a number of layers to delete;

selecting the one or more layers based on the number; and deleting the selected layers.

11. The system of claim 10, wherein the one or more layers are selected at random.

12. The system of claim 8, wherein the deleting one or more layers includes deleting one or more blocks, each block including a continuous set of layers.

13. The system of claim 8, wherein the training includes:

inputting training data into the student model and the teacher model;

receiving a student feature from the student model;

receiving a teacher feature from the teacher model;

performing a first comparison between the student feature and the teacher feature;

receiving a student output from the student model;

performing a second comparison between the student output and the training data; and adjusting at least one layer of the pruned set of layers of the student model based on the first comparison and the second comparison.

14. The system of claim 8, wherein each of the set of machine learning models are selected from a model repository.

15. A computer program product for selecting a machine learning model, the computer program product comprising:

one or more computer-readable storage media;

program instructions, stored on at least one of the one or more storage media, to receive hardware specifications of a device;

program instructions, stored on at least one of the one or more storage media, to receive output-based requirements of the device;

program instructions, stored on at least one of the one or more storage media, to determine a performance requirement based on the hardware specifications and the output-based requirements of the device;

program instructions, stored on at least one of the one or more storage media, to acquire a set of machine learning models from a repository of machine learning models accessible to the device, the set of machine learning models including:

a first machine learning model having a first set of layers, wherein each layer of the first set of layers manipulates input in a different way in order to produce its individual output; and a teacher model;

program instructions, stored on at least one of the one or more storage media, to determine a threshold number of layers from the first set of layers to form a pruned set of layers;

program instructions, stored on at least one of the one or more storage media, to delete one or more layers of the first set of layers from the first machine learning model, resulting in a student model with the pruned set of layers having a number of layers at or below the threshold number of layers;

program instructions, stored on at least one of the one or more storage media, to train the student model based on:

training data; and the teacher model;

program instructions, stored on at least one of the one or more storage media, to evaluate a performance of the student model;

program instructions, stored on at least one of the one or more storage media, to compare the performance of the student model and the performance requirement;

determine, based at least on the comparing, to select a model having a highest performance; and program instructions, stored on at least one of the one or more storage media, to deploy the model having the highest performance on the device wherein each of the pruned set of layers is developed over time while training the student model.

16. The computer program product of claim 15, further comprising:

program instructions, stored on at least one of the one or more storage media, to receive an additional performance requirement from a user, wherein the comparing further includes comparing the performance of the student model and the additional performance requirement.

17. The computer program product of claim 15, wherein the deleting one or more layers includes:

determining, based on the performance requirement, a number of layers to delete;

selecting the one or more layers based on the number; and deleting the selected layers.

18. The computer program product of claim 15, wherein the deleting one or more layers includes deleting one or more blocks, each block including a continuous set of layers.

19. The computer program product of claim 15, wherein the training includes:

inputting training data into the student model and the teacher model;

receiving a student feature from the student model;

receiving a teacher feature from the teacher model;

performing a first comparison between the student feature and the teacher feature;

receiving a student output from the student model;

performing a second comparison between the student output and the training data; and adjusting at least one layer of the pruned set of layers of the student model based on the first comparison and the second comparison.

20. The computer program product of claim 15, wherein each of the set of machine learning models are selected from a model repository.

\* \* \* \* \*